US006656998B1

(12) United States Patent
Robeson et al.

(10) Patent No.: US 6,656,998 B1
(45) Date of Patent: Dec. 2, 2003

(54) GLOSSY PAINTS CONTAINING EMULSION POLYMERS OF VINYL ACETATE

(75) Inventors: Lloyd Mahlon Robeson, Macungie, PA (US); Lori Anderson Vratsanos, Breinigsville, PA (US); Susan Ann Miller, Orefield, PA (US)

(73) Assignee: Air Products Polymers, L.P., Allentown, PA (US)

( * ) Notice: Subject to any disclaimer, the term of this patent is extended or adjusted under 35 U.S.C. 154(b) by 0 days.

(21) Appl. No.: 09/562,345

(22) Filed: May 1, 2000

(51) Int. Cl.$^7$ .............................................. C08L 31/04
(52) U.S. Cl. ...................... 524/501; 524/524; 524/563; 524/564
(58) Field of Search ................... 524/501, 524, 524/563, 564, 803; 523/334

(56) References Cited

U.S. PATENT DOCUMENTS

| | | | | |
|---|---|---|---|---|
| 3,316,198 A | * | 4/1967 | Sperry et al. ................ | 524/524 |
| 3,838,085 A | * | 9/1974 | Myers et al. ................ | 524/430 |
| 4,219,454 A | * | 8/1980 | Iacoviello et al. .......... | 524/812 |
| 4,350,782 A | * | 9/1982 | Kuchler et al. ............. | 523/334 |
| 4,647,610 A | * | 3/1987 | Sperry et al. ................ | 524/377 |
| 5,308,890 A | | 5/1994 | Snyder ....................... | 523/201 |
| 5,731,377 A | | 3/1998 | Friel et al. .................. | 524/522 |
| 5,907,011 A | * | 5/1999 | Jakob et al. ................ | 524/524 |
| 5,972,272 A | * | 10/1999 | Nagase et al. .............. | 264/324 |

FOREIGN PATENT DOCUMENTS

| | | | |
|---|---|---|---|
| GB | 1255482 A | * | 12/1971 |
| JP | 60096636 | * | 5/1985 |

OTHER PUBLICATIONS

Daniels, "Vinyl Acetate Polymers", Encyclopedia of Polymer Science and Engineering, vol. 17, p. 393–426 (1989).
Patel, et al., "Characterization of Latex Blend Films by Atomic Force Microscopy", Polymer, vol. 37, No. 25, pp. 5577–5582 (1996).
Fream and Magnet, "Low VOC, High Performance Coating Formulation" Farg och Lack Scandinavia, Jan. 1998, pp. 4–9.

* cited by examiner

*Primary Examiner*—Callie Shosho
(74) *Attorney, Agent, or Firm*—Mary E. Bongiorno

(57) ABSTRACT

Water-borne paints having an ASTM 60° gloss value of at least 10 are formulated with a latex of a copolymer of vinyl acetate and ethylene or alkyl acrylate having a dry glass transition temperature ($T_g$) below 20° C. and a latex of a polymer of vinyl acetate having a dry $T_g$ above room temperature but a $T_g$ when wet below 23° C. so that it is film-forming from the latex at room temperature. These paints are suitable for service as satin, semi-gloss or high gloss coatings but preferably are used as semi-gloss paints. The addition of the higher $T_g$ polymer of vinyl acetate to the lower $T_g$ copolymer provides a paint free with low to no volatile organic content but exhibiting improved blocking resistance without significant reduction in gloss.

28 Claims, No Drawings

GLOSSY PAINTS CONTAINING EMULSION POLYMERS OF VINYL ACETATE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to glossy paint formulations containing blends of latexes of hard and soft polymers of vinyl acetate. In another aspect it relates to paints capable of forming coatings having improved resistance to blocking without diminished gloss. In still another aspect it relates to a method of making non-blocking semi-gloss paint.

The need today for architectural coating materials free from volatile organic content (VOC) for both safety and health reasons is well documented. The switch to waterborne or high solids paints has answered this need, but there still remains a problem with respect to paints where surface luster is important, such as in satin, semi-gloss and high gloss paints. Such paints need to have good blocking resistance to keep painted surfaces, such as on doors and windows, from sticking. This problem has been addressed by incorporating organic solvents, but this approach partially defeats a major advantage of using water-based paints. While the blocking problem can be alleviated by incorporating "hard" polymers, i.e. polymers having a relatively high glass transition temperature ($T_g$), into the formulation, this step has generally resulted in the reduction of gloss values in the finished coating.

Daniels in "Vinyl Acetate Polymers", *Encyclopedia of Polymer Science and Engineering*, Vol. 17, p. 393–425 (1989) states that it has long been the practice to modify latex film properties by blending one polymer latex with another, for example, making a "soft" polymer less blocking with a "hard" polymer. As examples, he describes compatible solvent blends of poly(vinyl acetate) with poly(ethyl methacrylate), cholesterol and derivatives thereof, poly (butyl acrylate), poly(ethylene oxide) with poly(methyl methacrylate), and terpolymers of acrylonitrile, methyl acrylate and Na methylpropenyl sulfonate. The issue of gloss is not addressed.

Snyder, U.S. Pat. No. 5,308,890 (1994) discloses an approach to the blocking problem in multi-stage latex polymers by incorporating into the multi-stage latex polymer a latex which is not film-forming at ambient temperature. The nonfilm-forming polymers named are copolymers of butyl acrylate or ethyl acrylate with methyl methacrylate and methacrylic acid and/or styrene (with $T_g$ (glass transition temperature) values above room temperature). Film gloss was not an issue. Never-the-less, it was observed by Patel et al. in "Characterization of Latex Blend Films by Atomic Force Microscopy", *Polymer*, Vol. 37, No. 25, pp. 5577–82 (1996) that the incorporation of a latex of a hard polymer into the latex of a soft polymer increases surface roughness of the polymer film in proportion to the hard polymer in the blend. The polymers studied were copolymers of butyl acrylate and methyl methacrylate. A similar observation was made by Fream & Magnet in "Low VOC, High Performance Coating Formulation", *Farg och Lack Scandinavia*, 1/1998, pp. 4–9. These authors discussed the effects of blending two carboxylated styrene acrylate latexes, one having a $T_g$ of 57° C. and the other a $T_g$ of 0° C., in coating formulations. Although a reduction in film surface tack was noted, there was also considerable reduction in gloss.

Friel, U.S. Pat. No. 5,731,377 (1998) discloses paints based on emulsion polymer blends of two different polymers having relatively high and low $T_g$ values, e.g. one polymer having a $T_g$ above 20° C. and the other a $T_g$ below 15° C. The purpose given for making such blends is to improve blocking resistance. Although an extensive list of possible monomers is given, the only polymers described as suitable for both the high and low $T_g$ polymers are copolymers of butyl acrylate and styrene and/or methacrylic acid and/or methyl methacrylate, and copolymers of ethylhexyl acrylate, styrene and acrylonitrile for high $T_g$ polymers. No data or evaluations are given on the effect of high $T_g$ polymers on paint gloss. It is clear from the foregoing references that the problem of eliminating VOC from paint formulations while improving blocking resistance without loss of gloss in the paint surface has heretofore not been solved.

BRIEF SUMMARY OF THE INVENTION

We have now discovered that a water-borne glossy paint can be made from a blend of latexes of vinyl acetate polymer and vinyl acetate copolymer having relatively high and low $T_g$ values, respectively, both polymers being film-forming at room temperature, with marked improvement in blocking resistance but without significant reduction of gloss. In many cases gloss is actually improved which is very surprising in view of the prior art.

The vinyl acetate polymer is preferably a homopolymer but can contain up to 15 weight percent of comonomer such as other vinyl esters and acrylates. This vinyl acetate polymer must have a dry glass transition temperature ($T_g$) above room temperature (23° C.) but a wet $T_g$ below room temperature. This polymer must also be film forming at room temperature. These vinyl acetate polymers are unique in this respect and differ functionally as well as chemically from the high $T_g$ ("hard") polymers used in the prior art to enhance blocking resistance in glossy paints containing soft polymers.

The copolymer of vinyl acetate can be a copolymer of vinyl acetate and ethylene or a copolymer of vinyl acetate and an alkyl acrylate, the alkyl group preferably containing 1 to 8 carbons. The copolymer is also film forming at room temperature, having a $T_g$ less than 20° C. The proportion of high $T_g$ polymer of vinyl acetate in the blend with the low $T_g$ copolymer of vinyl acetate is generally in the range of 5 to 75 weight percent, preferably 10 to 60 weight percent, based on the combined polymer solids. Latex blends in which from 20 to 50 weight percent of the polymer solids are from the high $T_g$ polymer of vinyl acetate are demonstrated in the data of the examples herein and are still more preferred.

This invention, which is embodied in both composition of matter and the process steps taken to form the composition, has application only to paints in which gloss or luster is important. These paint applications include satin and semi-gloss paints as well as high gloss paints. For satin paints, the ASTM gloss (60°) gloss value will be above 10. For semi-gloss paints, the gloss value will be above 30. The preferred systems will be semi-gloss paints, however, the compositions of this invention can also be employed for satin as well as high gloss applications. Glossy in the invention refers to paint surfaces having gloss values in the range of satin, semi-gloss and high gloss applications. Flat paints would have gloss values (ASTM 60° gloss) less than 10 and are outside the scope of this invention.

DETAILED DESCRIPTION OF THE INVENTION

The large market for architectural coatings (paint) has been continually undergoing changes in product type and formulation due to increasing need and regulation for lower VOC (volatile organic content) products. Initially (and continuing), the decrease in VOC paints involved a switch from solvent based to water-borne or high solids paints. The limitation on high solids due to viscosity problems has resulted in even more effort being expended on the development of water-borne paints. Nevertheless, for water-borne paints where gloss is important (e.g. satin, semi-gloss, high gloss) VOC addition is still necessary because the desired combination of properties (especially blocking resistance) has not been achievable without VOC addition. In water-borne paint, it has been well-recognized that a combination of relatively low $T_g$ and high $T_g$ polymer emulsions are necessary to yield film formation and blocking resistance at low to no VOC. This combination, however, leads to decreased gloss and thus is only viable in flat (low gloss) paints. With flat paints, the higher filler loading improves blocking resistance and gloss is not an issue. The present invention applies to glossy paints and uses a specific combination of low $T_g$/high $T_g$ vinyl acetate polymer emulsions to provide improved blocking resistance without significantly diminishing gloss values. Generally specific formulations are utilized for various levels of gloss desired in paints. These formulations can be for satin, semi-gloss and high gloss as well as flat applications. The level of pigment/filler are varied to yield the desired properties. It is desired to modify the low $T_g$ emulsion polymer with a high $T_g$ emulsion polymer whereby the blocking resistance improves but the gloss is basically unchanged or improved. If the gloss is significantly decreased, changes in the formulation will be required and may result in loss of other key properties such as scrub resistance.

Certain of the prior art references (e.g. Freil) note high $T_g$/low $T_g$ polymer combinations for paint applications and even semi-gloss applications, but fail to note the negative effects on gloss by adding high $T_g$ nonfilm-forming polymer emulsions to low $T_g$ polymer emulsions. The polymers discussed and investigated include acrylics and styrenics. Poly(vinyl acetate) offers unique differences compared to acrylics and styrenics relative to the specific application area of this invention. The lower water sorption of acrylics and styrenics will not allow for room temperature film formation with $T_g$'s above room temperature. Poly(vinyl acetate), on the other hand, with a $T_g$ of 33–35° C. (determined calorimetrically) is film-forming at room temperature when applied as an aqueous emulsion.

This invention offers an approach to low VOC, water-borne satin, semi-gloss or even high gloss paints where the combination of properties required for these applications are difficult to meet with a single emulsion polymer. It has been found that a specific combination of emulsion polymers (in the form of a simple emulsion blend) yields better properties than the unblended constituents for the architectural coating applications noted above. This invention involves the addition of a water-borne polymer of vinyl acetate, preferably poly(vinyl acetate) (PVAc), to a lower $T_g$ water-borne vinyl acetate copolymer. Lower $T_g$ as used herein means a glass transition temperature measured on dry samples calorimetrically (mid-point) at 10° C./min. heating rate of below room temperature (defined as 23° C. for this disclosure). The $T_g$ of the poly(vinyl acetate) measured on dry samples by the above noted protocol is above room temperature.

The polymer of vinyl acetate of this invention can be a homopolymer, i.e. poly(vinyl acetate), or a copolymer containing at least 85 weight percent vinyl acetate such that the dry $T_g$ is above room temperature and the wet (water immersion) $T_g$ is below room temperature. Comonomers which can comprise up to 15 weight percent of this vinyl acetate polymer include other vinyl esters such as vinyl propionate, vinyl versatate and the like, methacrylates such as methyl methacrylate, ethyl methacrylate, n-butyl methacrylate and the like, acrylates such as methyl acrylate, ethyl acrylate, n-butyl acrylate and the like, acrylic acid, methacrylic acid, maleic anhydride (also maleic acid), vinyl ethylene carbonate, and vinyl chloride. Although ethylene is not preferred as a comonomer for the high $T_g$ polymer due to its effect in suppressing the dry basis $T_g$ to below room temperature, it could be incorporated at low levels or utilized to balance the $T_g$ if a higher $T_g$ termonomer is incorporated into the structure.

The lower $T_g$ copolymers of vinyl acetate are preferably copolymers of vinyl acetate and ethylene and copolymers of vinyl acetate and acrylic comonomers with the vinyl acetate making up at least 60 weight percent of the copolymer. The minimum amount of comonomer is that required to achieve the desired dry $T_g$ for the copolymer. The acrylic monomer is an alkyl acrylate, preferably with the alkyl group containing 1 to 8 carbons, such as n-butyl acrylate, methyl acrylate, ethyl acrylate, 2-ethyl hexyl acrylate, and the like. Also included as possible copolymers of vinyl acetate are copolymers containing a third monomer, such as a terpolymer of vinyl acetate, ethylene and acrylates, such as n-butyl acrylate, ethyl acrylate, and the like. The copolymer of vinyl acetate and ethylene can also contain vinyl chloride as a third monomer. These are also preferred compositions. The vinyl acetate copolymers as described above can also contain small amounts of other monomers such as acrylic acid, methacrylic acid, maleic anhydride, and the like.

The vinyl acetate polymers of this invention can be produced by emulsion polymerization and the technology for polymerization is well known, having been commercially practiced for over four decades. These emulsions are prepared by the addition of vinyl acetate (and other monomers) to water containing a surfactant and/or protective colloid system. These surfactants can include anionic, non-ionic, and cationic surfactants. Generally anionic and non-ionic surfactants are preferred with non-ionic most preferred for this invention. The non-ionic surfactants include ethoxylated alkyl phenols and ethylene oxide/propylene oxide block copolymers. Protective colloids can also be employed as is or in admixtures with other surfactants. The preferred protective colloids are poly(vinyl alcohol) and hydroxyethylcellulose (HEC). The polymerization of the vinyl acetate homopolymers and copolymers of this invention involves free radical initiated polymerization. Typical free radical initiators include organic peroxides, azo initiators (such as 2,2'-azobisisobutyronitrile), peroxysulfates and redox initiation systems. Redox initiation systems include persulfate-bisulfate, hydrogen peroxide-iron, hydroperoxide-iron, and chlorate-bisulfate systems. Specific systems include a combination of potassium methyl acrylate, sodium or ammonium persulfate with various reducing agents such as sodium hydrogen sulfite, ascorbic acid, erythrobic acid, sodium formaldehyde sulfoxylate, and the like. Chain transfer agents such as mercaptans and thiols can be added to control the molecular weight. Additional details of these emulsion polymers and their preparation are detailed in discussions by Daniels in *Encyclopedia of Polymer Science and Engineering*, Volume 17, "Vinyl Ester Polymers", pp. 393–425, Wiley-Interscience, New York, 1989, and by Vaandezande et al. in *Emulsion Polymerization and Emulsion Polymers*, edited by P. A. Lovell and M. S. El-Aasser, "Vinyl Acetate Polymerization", pp. 563–584, John Wiley & Sons, New York, 1997.

The emulsion blends of this invention can be formulated to yield satin, semi-gloss or high gloss architectural coatings (paint) materials. The additives typically employed in such formulations include pigments such as $TiO_2$, fillers including $CaCO_3$, talc, mica, barium sulfate, silica and the like, clays, dispersing agents such as tetrasodium pyrophosphate, poly(acrylic acids) or soya lecithin, wetting agents, defoamers such as acetylenic diols, mineral oils or silicones, plasticizers, associative thickeners for rheology control, waxes, colorants, antioxidants, UV stabilizers, biocides, wet-adhesive emulsion additives, acrylic based emulsions, styrene based emulsions, coalescing agents such as texanol, butyl carbinol, hexylene glycol or ethylene glycol monobutyl ether, adipic, phthalic and benzoic acid esters of propane diol, propylene glycol ether, and the like, and additives for pH control. Compounds promoting freeze-thaw stability such as ethylene glycol and propylene glycol can also be added. A review of the technology involved with architectural coatings is given by Lowell in "Coatings", *Encyclopedia of Polymer Science and Engineering*, Vol. 3, pp. 615–675, Wiley-Interscience, New York, 1989. In general, formulations for glossy paints, including satin, semi-gloss and high gloss paints are well known in the art and do not require further elaboration.

The coatings of this invention can be applied by spray techniques, brushed onto substrates, applied with fiber-based rollers, applied using roll coating equipment and the like. The substrates to which the coatings of this invention can be applied include wood-based, plasterboard, cement, wallpaper, previously coated surfaces, stucco, leather, plastic-based surfaces, plastic film, paper, cardboard, metal and the like. The coatings are utilized preferably in interior applications but exterior applications can also be considered. The application to poly(vinyl chloride), PVC, (vinyl) based surfaces can be employed as the VAE (vinyl acetate-ethylene) compositions of this invention have demonstrated good adhesion to such substrates.

The levels of addition of the high $T_g$ vinyl acetate polymers to the low $T_g$ vinyl acetate copolymer emulsions according to this invention are in the range of 5 to 75 weight percent, solids basis, based on the total emulsion polymers used, including both the high $T_g$ and the low $T_g$ polymers plus any other emulsion polymer additions. Preferably the proportion of the high $T_g$ vinyl acetate polymer is from 20 to 60 weight percent, and even more preferably is 20 to 50 weight percent.

The desired particle size for the higher $T_g$ vinyl acetate polymer is an average diameter of less than 0.35 microns and preferably less than 0.25 microns. The desired particle size for the lower $T_g$ vinyl acetate based emulsion is an average diameter of less than 0.5 microns with a preferred average particle size diameter of less than 0.35 microns. The emulsion polymer blends of this invention are novel for semi-gloss paints as well as high gloss or satin type coating systems in which advantages in maintaining gloss values are realized. The gloss values which this invention is able to maintain or realize through improvement as read with a gloss meter off of paint surfaces at 60° are greater than 10 for satin paints and greater than 30 for semi-gloss paints using the standard ASTM method.

Other variations, advantages and features of our invention will be apparent to those skilled in the art from the following Examples which are presented to be illustrative of the invention and not to limit it unduly.

EXAMPLES

A number of commercially available polymer emulsions were used in the following examples and descriptions of these polymers are listed in Table 1. Air Products and Chemicals, Inc. of Allentown, Pa. was the source of all polymers except Rovene 4106 which was obtained from Ameripol Synpol Corporation. The commercial emulsion designations are as given in Table 1.

TABLE 1

| Emulsion | Polymer Description | $T_g$ ° C. | Wt. % Solids | Particle Size |
|---|---|---|---|---|
| V-884 | Poly (vinyl acetate) | 35 | 52 | 0.17μ |
| A-810 | VAc Ethylene Copolymer | 5 | 55 | 0.30μ |
| A-809 | VAc Ethylene Copolymer | 2 | 55 | 0.19μ |
| F-325 | VAc-nBA Copolymer | 19 | 55 | 0.30μ |
| F-381 | VAc-nBA Copolymer | 13 | 55 | 0.30μ |
| Rovene 4106 | Styrene-Butadiene Copolymer | 69 | 50 | 0.17μ |
| A-4530 | VCl-Ethylene Copolymer | 30 | 50 | 0.11μ |

VAc = vinyl acetate, nBA = n-butyl acrylate, VCl = vinyl chloride

The formulations used commercially for water-borne semi-gloss paints are well known and fairly standard. Semi-gloss formulations involve initially preparing a grind paste which is then combined with water and the polymer emulsions. In these examples a typical grind paste recipe was used as set forth in Table 2.

TABLE 2

| Ingredient | Parts by Weight | Function | Supplier |
|---|---|---|---|
| Texanol | 3.50 | Coalescing Agent | Chemcentral |
| Propylene Glycol | 8.75 | Antifreeze | J.T. Baker |
| Tamol 731 | 3.5 | Dispersant | Rohm & Haas |
| Foamaster 44 | 0.50 | Defoamer | Henkel |
| AMP95 | 0.75 | pH Adjustment | Angus |
| Ti-Pure R-900 | 62.50 | $TiO_2$ Pigment | DuPont |
| Kathon LX 1.5% | 0.25 | Biocide | Rohm & Haas |
| Aerosol O.T. | 0.38 | Surfactant | Cytec |
| Water | 10 | | |
| Foamaster 44 | 0.50 | Defoamer | Henkel |
| Natrosol 250MR 3% | 43.75 | HEC Thickener | Hercules |

The grind paste was made using the order of addition of the compounds as listed in Table 2. Foamaster 44 appears twice in the order as it was added at two separate times. The grind paste (134.4 grams) was blended with x grams of water where x was calculated to maintain a consistent proportion of solids for the overall formulation, (for example, 17.8 grams of water for an emulsion with 55% solids), and 105 grams of the total polymer emulsion (55% solids basis). The samples were coated onto panels, allowed to dry and tested for gloss, reflectance, freeze/thaw resistance, scrub resistance and blocking resistance.

The preparation of the coating emulsions reported in the examples was carried out according to the following procedure: (1) The grind paste (134.4 grams) was weighed into a 500 ml beaker. (2) The grind paste was slowly mixed with a mechanical stirrer at 100 rpm. (3) Water to be added was slowly introduced into the beaker while gradually increasing stirrer speed to 200 rpm. (4) The emulsion (or emulsion blend) (105 grams) was added to the beaker with the stirrer speed gradually increased to 360 rpm. (5) The paint mixture was mixed for an additional 10 minutes. (6) Approximately ½" was poured into a 2 oz. plastic jar for Freeze-Thaw testing. (7) The rest of the paint mixture was poured into a 8 oz. plastic container. (8) Viscosities of the paint mixtures were taken 24–48 hours after the paints were prepared using a Brookfield digital viscometer that gives a display in Krebs Units (KU). Viscosities were measured on the samples in an 8 oz. plastic jar.

The Freeze-Thaw test was made by simply allowing the ½" of paint in the 2 oz. jar to go through up to 5 freezing and thawing cycles, and checking after each cycle with a wooden tongue depressor to see if the paint mixture was still stirrable and appeared smooth. The scrub testing followed ASTM Method D-2486-95.

The procedure of the blocking resistance tests was as follows:
(1) Draw down the coating on white, sealed Leneta paper, using a 3 mil film caster in a constant temperature and humidity (CTH) room.
(2) After an appropriate drying time, cut the painted area of drawdown into 1.5"×1.5"squares.
(3) Place painted sides together to form a blocking pair.
(4) Prepare two to three pairs of each sample for each run and stack pairs of the same time test together (up to 6 pairs).
(5) Top with a No. 8 rubber stopper, small diameter down, then a 100 g, a 500 g or a 1000 g weight.
(6) After a predetermined time, separate each pair from a corner.
(7) Listen to the sounds produced and look for paint separation and/or tearing. Assign to each sample a blocking grade number from 0 to 10, based on the ASTM ratings noted as follows: ASTM Block Resistance Ratings: 0) 75 to 100% seal; 1) 50 to 75% seal; 2) 25 to 50% seal; 3) 5 to 25% seal; 4) very tacky; no seal; 5) moderate tack; 6) slight tack; 7) very slight to slight tack; 8) very slight tack; 9) trace tack; 10) no tack. In addition to the blocking test procedure noted above; ASTM Method D 4946-89 (reapproved 1994) was also employed for additional blocking resistance evaluations.

For optical measurements, drawdowns of the paint composition were done on opacity display charts using a 3 mil film caster. Films were dried in the CTH room in a horizontal position for at least 24 hours. Films were read with a gloss meter at a minimum of 3 locations for each optical category and an average was taken. ASTM D 2805-96a and ASTM D 523-89 (reapproved 1994) procedures were followed for the reflectance, contrast ratio and gloss data reported for the various compositions noted in the following examples.

Example 1
Paints Containing Poly(vinyl acetate) and Vinyl Acetate/Ethylene Copolymer A series of blends (runs 1–5) were prepared and tested employing the protocol noted above. Formulations for semi-gloss paint were made from the grind paste recipe given above and latexes of poly(vinyl acetate) homopolymer (PVAc) (emulsion V-884) and a copolymer of vinyl acetate and ethylene (VAE) (emulsion A-810) in the proportions given in Table 3, solids basis. Run No. 1 was a control run containing no PVAc. The paints were evaluated as described above and the results are given in Table 3. Blocking resistance tests were run as described using contact times of 1.5 hours and weights of 100 and 500 grams, and according to the ASTM Method using a 1000 gram weight and contact times of 1, 4 and 24 hours. The values for three tests are given for each evaluation.

TABLE 3

| Run No. | 1 | 2 | 3 | 4 | 5 |
|---|---|---|---|---|---|
| VAE/PVAc Wt. Ratio | 100/0 | 80/20 | 70/30 | 60/40 | 50/50 |
| Non-Blocking (100 g) | 3, 3, 3 | 8, 8, 8 | 8, 9, 8 | 10, 8, 8 | 9, 10, 9 |
| Non-Blocking (500 g) | 0, 0, 0 | 7, 7, 6 | 7, 8, 8 | 7, 7, 7 | 8, 9, 9 |
| ASTM Blocking (1 hr) | 1, 0, 1 | 9, 9, 9 | 7, 7, 8 | 7, 8, 8 | 10, 9, 10 |
| ASTM Blocking (4 hr) | 0, 0, 0 | 6, 5, 5 | 6, 6, 5 | 5, 5, 3 | 6, 7, 7 |
| ASTM Blocking (24 hr) | 1, 0, 1 | 0, 0, 0 | 0, 0, 0 | 0, 0, 1 | 0, 3, 3 |
| 20° Gloss | 8.5 | 8.5 | 11.2 | 11.3 | 10.9 |
| 60° Gloss | 48.7 | 49 | 54.4 | 53.6 | 52.2 |
| Viscosity (24 hr KU) | 95 | 94 | 97 | 98 | 97 |
| Reflectance | 94.8 | 94.2 | 93.9 | 95.3 | 94.5 |
| Contrast Ratio | 0.985 | 0.979 | 0.976 | 0.982 | 0.981 |
| Freeze/Thaw Cycles | (1) fail | (2) fail | (4) fail | pass | (4) fail |
| Reflectance/Black | 93.4 | 92.2 | 91.6 | 93.6 | 92.7 |
| Scrub Resist. (cycles) | 53,000 | 4788 | 1849 | 1099 | 813 |

The above results show that the addition of the PVAc homopolymer (V-884) to the VAE copolymer leads to improved gloss and a significant improvement in block resistance compared to the control run 1. This combination of results was quite unexpected. The most significant blocking resistance data are those obtained after 1 to 4 hours contact time. The 24-hour contact time test is quite severe and is not required of an interior semi-gloss water-borne paint, but data are included for completeness. Also, the freeze/thaw data are included for information, but the formulator can readily correct a fail evaluation by adding more propylene glycol if the likely storage conditions of the paint so require. Although the scrub resistance was reduced, as a practical matter this is not significant for these paints because a paint exhibiting about 1000 cycles or more in the scrub resistance testing is considered acceptable. Viscosity values between about 90 to 100 KU are desirable. All of the evaluations of reflectance and contrast are acceptable for semi-gloss paint. There were essentially no changes in these evaluations as a result of adding the PVAc.

Example 2
Paints Containing PVAc and VAE Emulsions

The procedures of Example 1 were repeated in three runs (6, 7 and 8) using a different vinyl acetate/ethylene copolymer emulsion (A-809). Run 6 is the control. A fourth run was made (run 9) in which the vinyl acetate/ethylene copolymer emulsion was a blend of two emulsions, A-809 and A-810 in 50/50 proportions based on the weight of polymer solids in the emulsions. The results are given in Table 4.

TABLE 4

| Run No. | 6 | 7 | 8 | 9 |
|---|---|---|---|---|
| VAE/PVAC Weight Ratio | 100/0 | 70/30 | 50/50 | 60/40 |
| Non-Blocking (1.5 hr. 100 g) | 2, 2, 1 | 3, 4, 4 | 5, 6, 6 | 7, 8, 8 |
| Non-Blocking (1.5 hr. 500 g) | 0, 0, 0 | 0, 3, 3 | 5, 5, 5 | 3, 6, 5 |
| ASTM Blocking (1 hr. 1 kg) | NA | NA | NA | 6, 7, 6 |
| ASTM Blocking (4 hr. 1 kg) | NA | NA | NA | 5, 5, 1 |
| ASTM Blocking (24 hr. 1 kg) | NA | NA | NA | 0, 0, 0 |
| 20° Gloss | 12.3 | 14.2 | 15 | 14.6 |
| 60° Gloss | 554 | 59.7 | 60.2 | 59 |
| Viscosity (24 hr. KU) | 91 | 96 | 99 | 99 |
| Reflectance | 93.6 | 94.2 | 94.3 | 94.1 |
| Contrast Ratio | 0.98 | 0.98 | 0.984 | 0.976 |
| Reflectance/Black | 91.7 | 92.3 | 92.8 | 91.8 |
| Freeze/Thaw Cycles | (1) fail | (1) fail | (1) fail | (2) fail |
| Scrub Resistance (cycles) | >30,000 | 4805 | 1737 | 1620 |

Runs 7 and 8 of this Example show that the addition of PVAc homopolymer (V-884) yields a significant improvement in block resistance along with a modest improvement in gloss compared with control example 6. The other evaluations are very similar to those of Example 1. Run 9 which used a blend of VAE emulsions showed improvement in blocking resistance over the runs 7 and 8 which contained only one VAE emulsion (A-809) and improvement in gloss over run 4 which contained only one VAE emulsion (A-810) in a 60/40 blend with PVAc. These data demonstrate that mixtures of VAE emulsions can be enhanced in both gloss and blocking resistance by the addition of PVAc emulsion (compare with runs 1 and 6) and in this way the properties of the paint can be tailored to meet desired characteristics.

Example 3
Paints Containing PVAc and Vinyl Acetate-Acrylic Copolymer

Paints were formulated and evaluated using the procedures of Example 1 except that the vinyl acetate copolymer was a copolymer of vinyl acetate and n-butyl acrylate (VAcBA), using the commercial emulsion F-325. The results for these runs 10–13 are given in Table 5. Run 10 is the control.

TABLE 5

| Run No. | 10 | 11 | 12 | 13 |
|---|---|---|---|---|
| VAcBA/PVAc Wt. Ratio | 100/0 | 70/30 | 60/40 | 50/50 |
| Non-Blocking (100 g) | 7, 7, 7 | 10, 10, 10 | 10, 10, 10 | 10, 10, 10 |
| Non-Blocking (500 g) | 6, 3, 6 | 8, 8, 7 | 8, 9, 9 | 8, 9, 9 |
| ASTM Blocking (1 hr.) | 3, 2, 3 | 8, 8, 7 | 8, 9, 9 | 8, 9, 9 |
| ASTM Blocking (4 hr.) | 0, 0, 0 | 1, 5, 3 | 6, 7, 3 | 7, 7, 7 |
| ASTM Blocking (24 hr.) | 0, 0, 0 | 0, 0, 0 | 0, 0, 0 | 0, 0, 0 |
| 20° Gloss | 18.6 | 15.3 | 15 | 15.1 |
| 60° Gloss | 61.1 | 56.6 | 56.6 | 57.3 |
| Reflectance | 94.4 | 94.7 | 94.9 | 94.8 |
| Contrast Ratio | 0.977 | 0.986 | 0.983 | 0.985 |
| Reflectance/Black | 92.2 | 93.4 | 93.3 | 93.4 |
| Viscosity (24 hr. KU) | 91 | 96 | 98 | 98 |
| Freeze/Thaw (cycles) | Pass | Pass | Pass | Pass |
| Scrub Resist. (cycles) | 2685 | 1316 | 1247 | 1123 |

The addition of PVAc homopolymer (V-884) to vinyl-acrylic (F-325), runs 11, 12, and 13, show a significant improvement in block resistance with only modest decreases in gloss compared with the control run 10. The comments made in Example 1 with respect to evaluations of the other properties apply here, except these paints do not require adjustment to pass the freeze/thaw test.

Example 4
Paints Containing PVAc and Vinyl Acetate-Acrylic Copolymer

The procedures of Example 3 were repeated using a different copolymer of vinyl acetate and n-butyl acrylate, namely emulsion F-381. The test results for these runs 14–17 are given in Table 6. Run 14 is the control.

TABLE 6

| Run No. | 14 | 15 | 16 | 17 |
|---|---|---|---|---|
| VacBA/PVAc Wt. Ratio | 100/0 | 70/30 | 60/40 | 50/50 |
| ASTM Blocking (1 hr.) | 0, 0, 0 | 8, 8, 7 | 8, 8, 8 | 9, 9, 9 |
| ASTM Blocking (4 hr.) | 0, 0, 0 | 1, 2, 0 | 3, 3, 4 | 9, 9, 8 |
| ASTM Blocking (24 hr.) | 0, 0, 0 | 0, 0, 0 | 0, 0, 0 | 1, 0, 0 |
| 20° Gloss | 17.9 | 17.5 | 16.2 | 14.6 |
| 60° Gloss | 63.4 | 61.1 | 59.9 | 57.1 |
| Reflectance | 94.8 | 94.9 | 95 | 95 |
| Contrast Ratio | 0.986 | 0.986 | 0.986 | 0.985 |
| Reflectance/Black | 93.5 | 93.6 | 93.7 | 93.6 |
| Viscosity (24 hr. KU) | 99 | 102 | 102 | 102 |

TABLE 6-continued

| Run No. | 14 | 15 | 16 | 17 |
|---|---|---|---|---|
| Freeze/Thaw (cycles) | (1) fail | (1) fail | (1) fail | (1) fail |
| Scrub Resist. (cycles) | 3885 | 1663 | 1608 | 1254 |

The data of this Example show that the addition of PVAc to another vinyl-acrylic results in a significant improvement in blocking resistance with only modest decreases in gloss.

Comparative Example 5
Paints Containing PVAc and/or SB Copolymer and VAE

The procedure of Example 1 was repeated using a blend of emulsions. In comparative runs 18 and 19, a portion of the PVAc in a blend with a VAE emulsion (A-810) was replaced with an emulsion of a copolymer of styrene and butadiene, Rovene 4106, (SB). In runs 20, 21 and 22 this copolymer of styrene and butadiene which is a high $T_g$ polymer was used instead of PVAc to reduce blocking. In runs 20 and 21 the VAE component was a 50/50 blend of emulsions A-810 and A-809. In run 22 emulsion A-809 was the VAE component. Evaluations are given in Table 7.

TABLE 7

| Run No. | 18 | 19 | 20 | 21 | 22 |
|---|---|---|---|---|---|
| PVAc/VAE/SB | 30/50/20 | 35/55/10 | 0/80/20 | 0/90/10 | 0/80/20 |
| Non-Blocking (1.5 hr., 100 g) | 10, 10, 10 | 9, 9, 10 | 8, 8, 8 | 3, 3, 3 | 6, 6, 6 |
| Non-Blocking (1.5 hr., 500 g) | 10, 10, 10 | 9, 9, 9 | 8, 8, 8 | 2, 2, 2 | 3, 3, 3 |
| ASTM Blocking (1 hr.) | 10, 10, 10 | 10, 10, 10 | 8, 7, 7 | 3, 3, 4 | 5, 4, 5 |
| ASTM Blocking (4 hr.) | 10, 10, 10 | 9, 9, 9 | 6, 6, 7 | 0, 0, 1 | 3, 3, 3 |
| ASTM Blocking (24 hr.) | 8, 8, 8 | 7, 7, 8 | 3, 3, 2 | 0, 0, 0 | 2, 2, 2 |
| 20° Gloss | 2.1 | 3.3 | 2.1 | 4.8 | 3.5 |
| 60° Gloss | 24.5 | 32.1 | 25.5 | 40.4 | 36.6 |
| Reflectance | 96.6 | 95.2 | 96 | 94.9 | 95.5 |
| Contrast Ratio | 0.976 | 0.985 | 0.979 | 0.98 | 0.98 |
| Reflectance/Black | 94.3 | 93.8 | 94 | 93 | 93.6 |
| Freeze/Thaw (cycles) | (3) | pass | (1) fail | (1) fail | (1) fail |
| Scrub Resistance (cycles) | 273 | 612 | 20,168 | 27,823 | 30,507 |
| Viscosity (24 hr. KU) | 95 | 96 | 94 | 93 | 95 |

The data of Table 7 show that partial or full replacement of PVAc with another high $T_g$ polymer, styrene/butadiene copolymer emulsion, results in substantial reduction in gloss, well below acceptable limits for semi-gloss applications, except for run 21 which had a barely acceptable 60° gloss value but did not exhibit good blocking resistance. Comparing the 80/20, VAE/SB, runs 20 and 22 with the 80/20, VAE/PVAc, run 2, shows that the PVAc is unique in providing improved blocking resistance without diminished gloss in these paints.

Comparative Example 6
Paints Containing Emulsions of VAE and EVCl

The procedure of Examples 1 and 2 was repeated using an emulsion of a copolymer of ethylene and vinyl chloride (EVCl), emulsion A-4530, as the high $T_g$ polymer for combination with vinyl acetate/ethylene copolymer in order to improve blocking resistance in the applied semi-gloss paint. The VAE emulsions used were emulsion A-809, runs 23 and 24, and emulsion A-810, runs 25 and 26. Evaluations are given in Table 8.

TABLE 8

| Run No. | 23 | 24 | 25 | 26 |
|---|---|---|---|---|
| VAE/EVCl (weight ratio) | 70/30 | 60/40 | 70/30 | 60/40 |
| Non-Blocking(1.5 hr 100 g) | 8, 8, 7 | 9, 9, 9 | 10, 10, 10 | 10, 10, 10 |
| Non-Blocking (1.5 hr. 500 g) | 8, 7, 6 | 8, 8, 8 | 10, 10, 10, | 10, 10, 10 |
| ASTM Blocking (1 hr. 1 kg) | 7, 8, 7 | 8, 8, 8 | 10, 10, 10 | 10, 10, 10 |
| ASTM Blocking (4 hr. 1 kg) | 6, 7, 7 | 8, 8, 8 | 8, 8, 8 | 10, 10, 10 |
| 20° Gloss | 6.2 | 5.1 | 2.6 | 2.3 |
| 60° Gloss | 43.1 | 39.7 | 27.1 | 23.6 |
| Reflectance | 95.6 | 95.9 | 96.2 | 96.9 |
| Contrast Ratio | 0.994 | 0.992 | 0.985 | 0.989 |
| Reflectance/Black | 95 | 95.1 | 94.8 | 95.8 |
| Freeze/Thaw (cycles) | (1) fail | (1) fail | (4) fail | (2) fail |
| Viscosity (24 hr. KU) | 94 | 94 | 94 | 93 |

The data of Table 8 show that the addition of EVCl (emulsion A-4530) as a high $T_g$ polymer to VAE polymer emulsions in semi-gloss paint formulations significantly increases blocking resistance in the applied paint film but at the expense of much lower gloss values. Compare runs 23 and 24 to run 6 and runs 25 and 26 to run 1. Even though the EVCl exhibits a lower $T_g$ than the PVAc (30° C. vs. 35° C., respectively), the EVCl is not film forming at room temperature.

While not to be bound by theory, it is believed that the reason poly(vinyl acetate) is so successful in reducing blocking without reducing gloss in these paints is that the PVAc is film forming at room temperature owing to its water sorption. Lower water sorption of other polymers, such as the acrylics and styrenics, does not allow for room temperature film formation because their $T_g$ values are above room temperature. Poly(vinyl acetate) has a calorimetrically determined dry $T_g$ of 33–35° C. but is film forming at room temperature due to approximately 3 weight percent water sorption. Water reduces the $T_g$ of PVAc by 12 to 15 degrees Centigrade per weight percent water sorbed. Consequently, in the water emulsion system of these paints the effective $T_g$ of the PVAc is less than room temperature (23° C.) and the PVAc is, therefore, film forming. In practice, resistance to blocking generally occurs at less than 100% relative humidity as do the blocking tests which are generally at 50% relative humidity or well below 100%. The PVAc exhibits its higher dry $T_g$ under these conditions, thus yielding good blocking resistance. The film formation also allows for good scrub resistance, albeit not as good as the low $T_g$ emulsion that the PVAc is blended with, but better than non-film forming high $T_g$ polymer additives used in the prior art paint formulations. Also, compatibility of the polymers in the latexes is good since both the high and low $T_g$ polymers contain vinyl acetate.

The data of the above Examples demonstrate quite clearly that in glossy paint formulations containing a low $T_g$ vinyl acetate copolymer the addition of a polymer of vinyl acetate that has a dry glass transition temperature above room temperature but is film forming at room temperature from its aqueous emulsion provides clear advantages in reducing blocking tendencies in the applied paint film without substantial reduction in gloss values. This result could not have been predicted and is indeed quite unexpected. These Examples also demonstrate, as has been noted in publications cited above, that nonfilm-forming high $T_g$ emulsions significantly decrease the gloss of films applied from emulsions of low $T_g$ polymers. On the other hand, a high $T_g$ polymer emulsion of poly(vinyl acetate) that is film-forming at room temperature not only improved the blocking resistance but did not result in a significant gloss reduction. In fact, in many cases increased gloss was observed. The examples presented utilize a typical semi-gloss formulation. The results of blocking resistance and gloss values for satin formulations as well as high gloss formulations will follow the same trends as noted in the semi-gloss examples.

Other embodiments of our invention will be apparent to those skilled in the art from the foregoing disclosure and the following claims without departing from the spirit or scope of the invention.

What is claimed is:

1. In a method of making a glossy, water-borne paint which comprises forming a formulation for glossy paint comprised of an aqueous emulsion selected from the group consisting of an aqueous emulsion containing a copolymer comprised of vinyl acetate and an alkyl acrylate or an aqueous emulsion containing a copolymer comprised of vinyl acetate and ethylene, the improvement for improving block resistance in said glossy paint which comprises:
   utilizing a blend of aqueous emulsions in said formulation, said blend consisting essentially of:
   a first emulsion of a polymer of vinyl acetate having a dry $T_g$ above room temperature but a wet $T_g$ below room temperature, said first emulsion being film-forming at room temperature, and
   a second emulsion of a copolymer of vinyl acetate, ethylene, and optionally a third monomer, or a copolymer of vinyl acetate, an alkyl acrylate, and optionally a third monomer, said copolymer of said second emulsion having a dry $T_g$ below 20° C., wherein said glossy, water-borne paint, when applied as a coating and dried, has an ASTM 60° gloss of at least 20.

2. The method of claim 1 wherein said polymer of vinyl acetate contains at least 85 weight percent vinyl acetate and said copolymer of vinyl acetate contains at least 60 weight percent vinyl acetate.

3. The method of claim 2 wherein said polymer of vinyl acetate is a homopolymer.

4. The method of claim 2 wherein said copolymer is a copolymer of vinyl acetate, ethylene, and optionally an acrylate, vinyl chloride, acrylic acid, methacrylic acid, or maleic anhydride.

5. The method of claim 2 wherein said copolymer is a copolymer of vinyl acetate and alkyl acrylate in which said alkyl group contains from 1 to 8 carbon atoms.

6. The method of claim 5 wherein said alkyl is methyl, ethyl, n-butyl or 2-ethyl hexyl.

7. The method of claim 1 wherein said first emulsion is an emulsion of poly(vinyl acetate), said second emulsion is an emulsion of a copolymer of vinyl acetate, ethylene, and vinyl chloride, or a copolymer of vinyl acetate, ethylene, and n-butyl acrylate.

8. The method of claim 1 wherein said first emulsion is an emulsion of poly(vinyl acetate), said second emulsion is an emulsionof a copolymer of vinyl acetate and n-butyl acrylate, and said paint formulation is for semi-gloss paint.

9. The method of claim 1 wherein said polymer of vinyl acetate makes up 5 to 75 weight percent of the polymer solids in a combination of said first emulsion and said second emulsion.

10. The method of claim 1 wherein said formulation is for a semi-gloss paint and said polymer of vinyl acetate makes up from 10 to 60 weight percent of the total polymer solids of said polymer of vinyl acetate and said copolymer of vinyl acetate.

11. In a method for forming a glossy architectural coating comprising: applying, to a substrate, a coating of a composition comprising a formulation for glossy paint which includes an aqueous emulsion selected from the group consisting of an aqueous emulsion of a copolymer of vinyl acetate and an alkyl acrylate or an aqueous emulsion of a copolymer of vinyl acetate and ethylene, the improvement which comprises increased blocking resistance of said glossy paint which comprises:

utilizing a blend of aqueous emulsions in said formulation, said blend consisting essentially of:

a first emulsion of a polymer of a vinyl acetate having a dry $T_g$ above room temperature but a wet $T_g$ below room temperature, said first emulsion being film-forming at room temperature, and a second emulsion of a copolymer of vinyl acetate, ethylene, and optionally a third monomer or a copolymer of vinyl acetate, an alkyl acrylate and optionally a third monomer, said copolymer of said second emulsion having a dry $T_g$ below 20° C.; and drying said coating, said dried coating having an ASTM 60° gloss of at least 20.

12. The method of claim 11 wherein said polymer of vinyl acetate contains at least 85 weight percent vinyl acetate and said copolymer of vinyl acetate contains at least 60 weight percent vinyl acetate.

13. The method of claim 11 wherein said polymer of vinyl acetate is a homopolymer.

14. The method of claim 11 wherein said copolymer of vinyl acetate is a copolymer of vinyl acetate, ethylene, and optionally an acrylate, vinyl chloride, acrylic acid, methacrylic acid, or maleic anhydride.

15. The method of claim 11 wherein said copolymer of vinyl acetate is a copolymer of vinyl acetate and alkyl acrylate in which said alkyl group contains from 1 to 8 carbon atoms.

16. The method of claim 15 wherein said first emulsion is an emulsion of poly(vinyl acetate) and said second emulsion is an emulsion of a copolymer of vinyl acetate and n-butyl acrylate.

17. The method of claim 11 wherein said dried coating has an ASTM 60° gloss of at least 30.

18. The method of claim 11 wherein said polymer of vinyl acetate makes up to 5 to 75 weight percent of polymer solids in a combination of said first emulsion and said second emulsion.

19. The method of claim 11 wherein said polymer of vinyl acetate makes up to 10 to 60 weight percent of polymer solids in a combination of said first emulsion and said second emulsion.

20. In a glossy architectural coating comprising:

a formulation for a glossy architectural coating, said formulation comprising an aqueous emulsion selected from the group consisting of an aqueous emulsion containing a copolymer comprised of vinyl acetate and an alkyl acrylate or an aqueous emulsion containing a copolymer of vinyl acetate and ethylene, the improvement in said coating for increased blocking resistance which comprises:

said formulation comprised of a blend consisting essentially of:

a first emulsion of a polymer of vinyl acetate having a dry $T_g$ above room temperature but a wet $T_g$ below room temperature, said first emulsion being film-forming at room temperature, and a second emulsion of a copolymer of vinyl acetate, ethylene, and optionally a third monomer or a copolymer of vinyl acetate, an alkyl acrylate and optionally a third monomer, said copolymer of said second emulsion having a dry $T_g$ below 20° C.;

said coating, when dry, having an ASTM 60° gloss of at least 20.

21. The coating of claim 20 wherein said polymer of vinyl acetate contains at least 85 weight percent vinyl acetate and said copolymer of vinyl acetate contains at least 60 weight percent vinyl acetate.

22. The coating of claim 20 wherein said polymer of vinyl acetate is a homopolymer.

23. The method of claim 20 wherein said copolymer of vinyl acetate is a copolymer of vinyl acetate, ethylene, and optionally an acrylate, vinyl chloride, acrylic acid, methacrylic acid, or maleic anhydride.

24. The coating of claims 20 wherein said copolymer of vinyl acetate is a copolymer of vinyl acetate and alkyl acrylate in which said alkyl group contains from 1 to 8 carbon atoms.

25. The coating of claim 20 wherein said first emulsion is an emulsion of poly(vinyl acetate) and said second emulsion is an emulsion of a copolymer of vinyl acetate and n-butyl acrylate.

26. The coating of claim 20 wherein said dried coating has an ASTM 60° gloss of at least 30.

27. The coating of claim 20 wherein said polymer of vinyl acetate makes up to 5 to 75 weight percent of polymer solids in a combination of said first emulsion and said second emulsion.

28. The coating of claim 20 wherein said polymer of vinyl acetate makes up to 10 to 60 weight percent of polymer solids in a combination of said first emulsion and said second emulsion.

* * * * *

UNITED STATES PATENT AND TRADEMARK OFFICE
CERTIFICATE OF CORRECTION

PATENT NO. : 6,656,998 B1
DATED : December 2, 2003
INVENTOR(S) : Robeson et al.

It is certified that error appears in the above-identified patent and that said Letters Patent is hereby corrected as shown below:

<u>Column 14,</u>
Line 28, delete "method" and substitute therefore -- coating --

Signed and Sealed this

Fourth Day of May, 2004

JON W. DUDAS
*Acting Director of the United States Patent and Trademark Office*